(12) United States Patent
Gong et al.

(10) Patent No.: US 10,686,659 B1
(45) Date of Patent: Jun. 16, 2020

(54) CONVERGED INFRASTRUCTURE LOGICAL BUILD OPTIMIZATION

(71) Applicant: VCE Company, LLC, Richardson, TX (US)

(72) Inventors: Changbin Gong, Sherborn, MA (US); Christopher A. Pappas, Walpole, MA (US)

(73) Assignee: EMC IP Holding Company LLC, Round Rock, TX (US)

( * ) Notice: Subject to any disclaimer, the term of this patent is extended or adjusted under 35 U.S.C. 154(b) by 757 days.

(21) Appl. No.: 14/536,448

(22) Filed: Nov. 7, 2014

(51) Int. Cl.
*H04L 12/24* (2006.01)

(52) U.S. Cl.
CPC ...... *H04L 41/0823* (2013.01); *H04L 41/0869* (2013.01)

(58) Field of Classification Search
CPC .................. H04L 41/145; H04L 41/0893
USPC ............................................................ 714/33
See application file for complete search history.

(56) References Cited

U.S. PATENT DOCUMENTS

| | | | | |
|---|---|---|---|---|
| 2003/0233571 A1* | 12/2003 | Kraus | ............ | G06F 9/466 726/15 |
| 2011/0078282 A1* | 3/2011 | Wei | ............ | H04L 67/06 709/219 |
| 2013/0014107 A1* | 1/2013 | Kirchhofer | ............ | G06F 9/5083 718/1 |
| 2014/0059385 A1* | 2/2014 | Dolinsky | ............ | G06F 11/3688 714/33 |
| 2014/0108000 A1* | 4/2014 | Datla | ............ | H04L 41/145 703/21 |
| 2014/0282395 A1* | 9/2014 | Wang | ............ | G06F 8/71 717/120 |
| 2015/0072326 A1* | 3/2015 | Mauri | ............ | A61B 5/0488 434/247 |
| 2015/0082016 A1* | 3/2015 | Bonczkowski | ............ | G06F 8/61 713/100 |
| 2016/0246746 A1* | 8/2016 | Tan | ............ | G06F 9/4411 |

* cited by examiner

*Primary Examiner* — Sm A Rahman
*Assistant Examiner* — Chen-Liang Huang
(74) *Attorney, Agent, or Firm* — Womble Bond Dickinson (US) LLP

(57) ABSTRACT

A method for determining compliance of a logical build in a converged infrastructure is provided. The method includes receiving a logical configuration survey in a predefined format, wherein the logical configuration survey represents a specification for a logical build to be implemented in a converged infrastructure. The method includes collecting data from the converged infrastructure regarding the logical build as implemented in the converged infrastructure, wherein the collecting is performed by an automated data collector. The method includes determining, from the collected data, whether the logical build as implemented complies with the logical configuration survey in the predefined format, wherein the determining is performed by a compliance scan engine.

17 Claims, 5 Drawing Sheets

CONVERGED INFRASTRUCTURE LOGICAL BUILD OPTIMIZATION

BACKGROUND

Pools of computing resources, such as servers, data storage, networks and related hardware and software can be employed as converged infrastructure, with resources flexibly allocated and managed. In some instances converged infrastructure may be shared across multiple businesses and offered as cloud resources. There are multiple steps for a logical build process when building and configuring converged infrastructure. One method is to define a logical configuration survey (LCS) in a spreadsheet form. The converged infrastructure is then built based upon configuration data defined in the logical configuration survey. When the logical build is completed, reports for the logical configuration of the converged infrastructure are manually generated, manually checked and manually compared to the spreadsheet form. Any discrepancies found in this manual checking and comparison are then noted, and the process is repeated in one or more iterations. This process tends to be both time-consuming and error-prone.

SUMMARY

Embodiments of a system, a device and an apparatus are provided. In some embodiments, a method for determining compliance of a logical build in a converged infrastructure is provided. The method includes receiving a logical configuration survey in a predefined format, wherein the logical configuration survey represents a specification for a logical build to be implemented in a converged infrastructure. The method includes collecting data from the converged infrastructure regarding the logical build as implemented in the converged infrastructure. The collecting may be performed by an automated data collector. The method includes determining, from the collected data, whether the logical build as implemented complies with the logical configuration survey in the predefined format. The determining is performed by a compliance scan engine in some embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A method and related system for converged infrastructure logical build optimization are discussed below. In the embodiments, a logical configuration survey (LCS) is translated into an LCS profile in a specified format. A user may initiate a logical build in an infrastructure, such as one or more network appliances hosting virtual machines and virtual local area networks (VLANs). A data collector, which could be a software or hardware module on a computing device, extracts or otherwise derives information about the logical build from the infrastructure. A scan engine, which could be a software or hardware module on the computing device, compares the LCS profile in the specified format and the information regarding the logical build, and determines compliance or lack of compliance through the comparison. Embodiments can make use of software executing on a processor, hardware, or firmware, and combinations thereof to optimize the logical build process for converged infrastructure.

Figure 1:
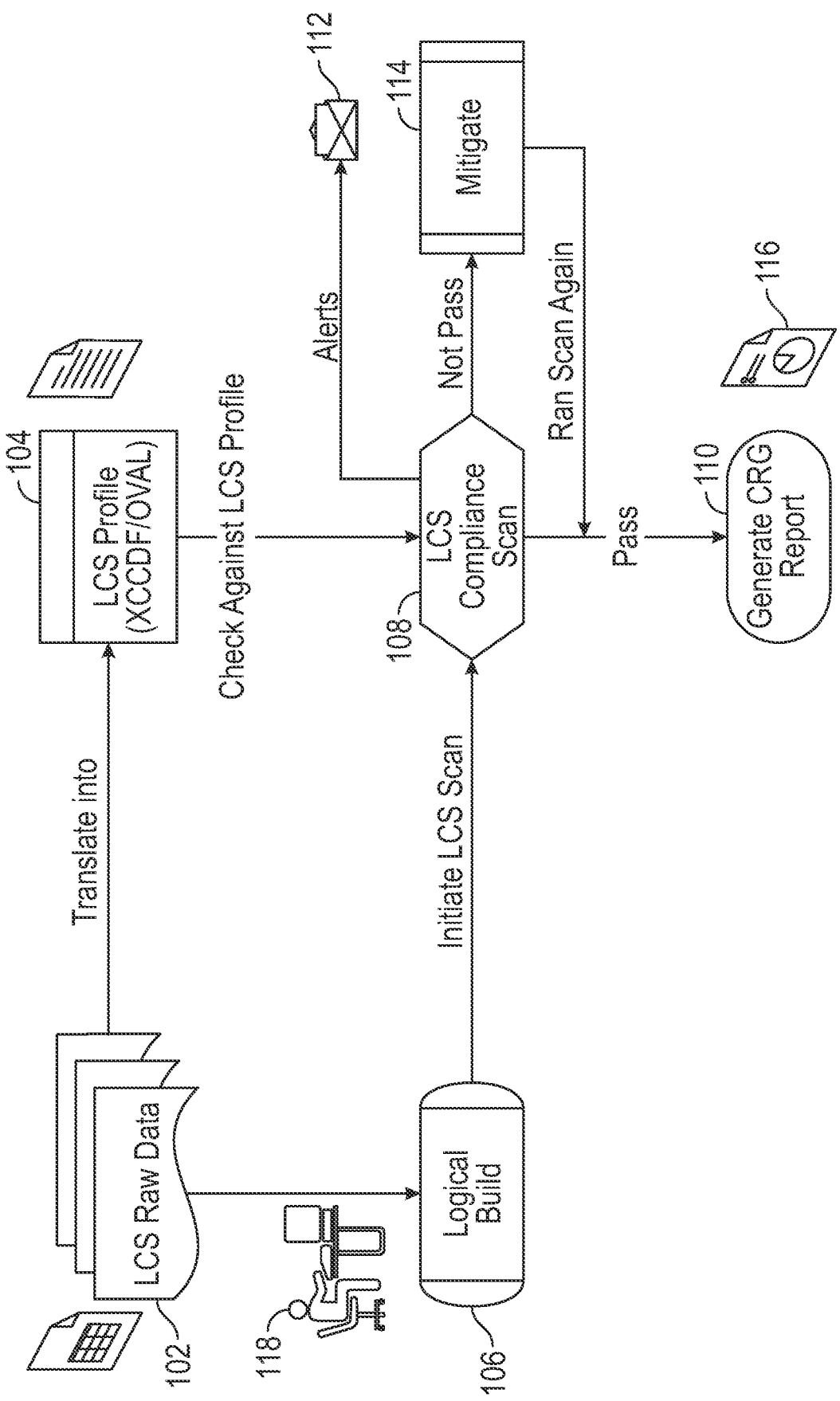
FIG. 1 is a process diagram showing an LCS (logical configuration survey) compliance scan applied to a logical build, in accordance with some embodiments.

FIG. 1 is a process diagram showing an LCS compliance scan 108 applied to a logical build 106, in accordance with some embodiments. LCS raw data 102 represents a specification for a logical build to be implemented in a converged infrastructure. The LCS raw data 102 can be in a spreadsheet format, a general format conforming to a user preference or standard, or a format specific to a commercial or proprietary system, device or other form of infrastructure on which a logical build 106 can be implemented. An example of an implementation of a logical build 106 is given with reference to FIG. 2. Generally, a user 118 guides the logical build 106, based on the LCS raw data 102. A predefined format is specified for the LCS profile 104. In some embodiments, the format is XCCDF (extensible configuration checklist description format), or OVAL (open vulnerability and assessment language). XCCDF is an XML (extensible markup language) format for specifying configurations and/or security. OVAL has several schemas in XML, which can be used for representing system information, representing a machine state and reporting results of an assessment. Further formats, using XML or other languages, can be devised and integrated with the embodiments as the examples provided are not meant to be limiting. In some embodiments a user translates the LCS raw data 102 into an LCS profile 104 in the predefined format. Alternatively, the user may create the LCS profile 104 directly in the predefined format. Automated translation of LCS raw data 102, in various predefined formats into the LCS profile 104 in the predefined format, is contemplated.

Continuing with FIG. 1, the LCS compliance scan 108 checks the logical build 106 against the LCS profile 104 in the specified (predefined) format. For example, the compliance scan 108 could verify compliance of network, compute, and storage components, IP (Internet Protocol) addresses, VLAN connections and so on. Any discrepancies are reported with one or more alerts 112. In situations where the LCS compliance scan 108 declares a "not pass" or otherwise indicates failure to comply, a mitigate process 114 can be initiated. Where the LCS compliance scan 108 declares a "pass", a generate CRG (configuration report guide) report process 110 is initiated resulting in a CRG report 116. The alert 112 could point to the possibility of error in the LCS raw data 102, the logical build 106, and/or the LCS profile 104. The mitigate process 114 generally involves user 118 revising the LCS raw data 102, revising the LCS profile 104 in the specified format and/or repeating the logical build 106, in order to correct for the discrepancies. For example, the alert 112 could indicate an incorrect or missing IP address, a missing VLAN or missing or incorrect VLAN connection, etc., in the logical build 106 as compared to the LCS profile 104. If this information was incorrectly specified in the LCS raw data 102, the mitigate process 114 should start with correcting the LCS raw data 102, and proceed to regenerating the logical build 106. If the LCS raw data 102 is correct, but there was an error in making the logical build 106, the logical build 106 should be regenerated. If the LCS raw data 102 is correct but there is an inaccuracy in the LCS profile 104 in the specified format, the inaccuracy should be corrected through editing, regeneration, or otherwise correcting the LCS profile 104. After performing the appropriate mitigation, the LCS profile 104 in the specified format would then be compared to the logical build 106 in another LCS compliance scan 108.

Figure 2:
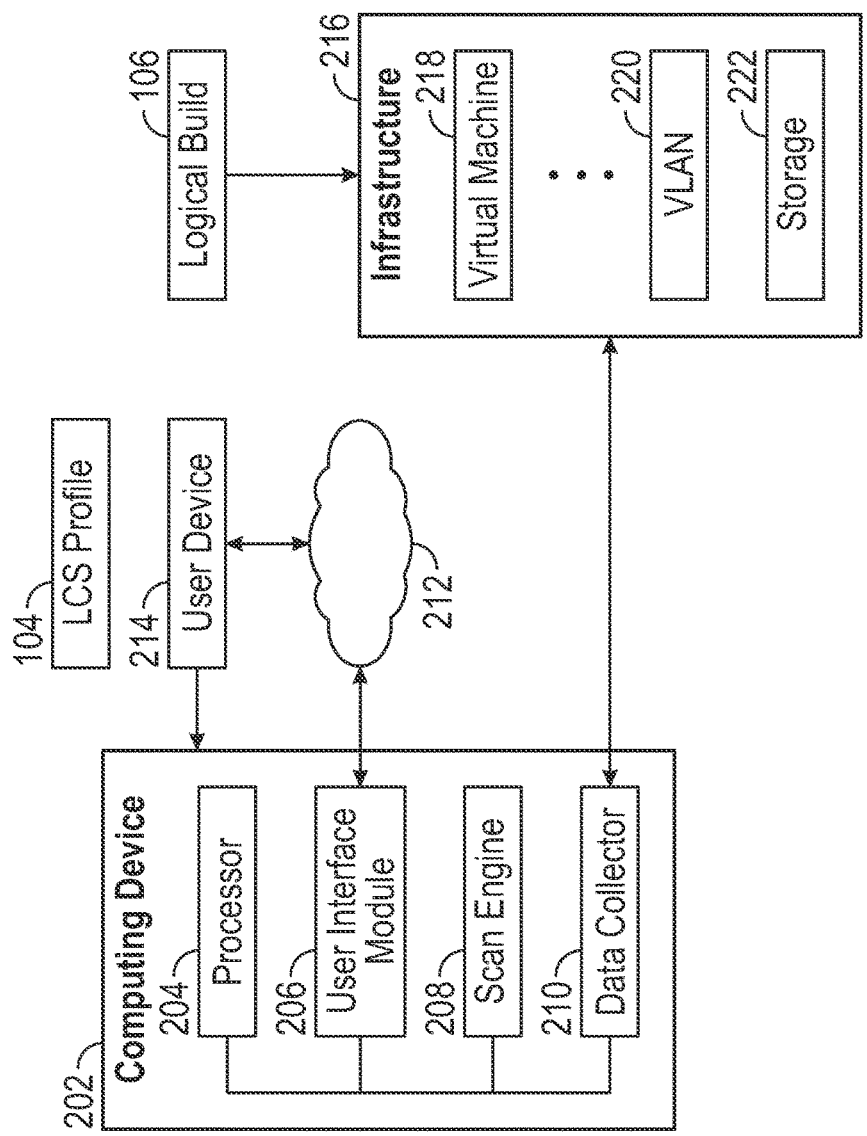
FIG. 2 is a system diagram of a user interface module, a scan engine and a data collector, which implement the LCS compliance scan depicted in FIG. 1 in accordance with some embodiments.

FIG. 2 is a system diagram of a user interface module 206, a scan engine 208 and a data collector module 210, which implement the LCS compliance scan 108 depicted in FIG. 1. These components can be implemented in a computing device 202, as software executing on a processor 204, hardware, firmware or combinations thereof. For example, the computing device could be a server or a network appliance coupled to the infrastructure 216. The infrastructure 216 could include various resources that can implement one or more virtual machines 218, one or more VLANs 220, one or more storages 222, and other components in a converged infrastructure. These could be in one or more data centers, or as cloud resources, etc. Coupling from the computing device 202 to the infrastructure 216 could include a network such as an intranet or the global communication network known as the Internet. Alternatively, the computing device 202 and the infrastructure 216 could be included in a computing device such as a network appliance or a server, the Vblock® system of the assignee or another converged infrastructure system. The user interface module 206 implements a graphical user interface, a command line interface or other user interface that can be presented to the user device 214 via a network 212. The user device 214 communicates the LCS profile 104 to the user interface module 206 via the network 212, so that the computing device 202 receives the LCS profile 104.

Still referring to FIG. 2, the data collector module 210 communicates with the infrastructure 216 and extracts, derives, requests or otherwise obtains information about the logical build 106 in the infrastructure 216. This process can be performed by crawling, polling, querying or other information gathering technique in some embodiments. The process of obtaining information about logical build 106 may be guided by the LCS profile 104, which indicates to the data collector module 210 where to look in the infrastructure 216, and what to look for and verify. In various embodiments, the data collector module 210 obtains the LCS profile 104 from the user interface module 206, obtains the LCS profile 104 from a memory coupled to the user interface module 206, the scan engine 208 and the data collector module 210, or the data collector module 210 cooperates with the scan engine 208 to determine what information to obtain from the infrastructure 216.

The scan engine 208 communicates with the user interface module 206, and obtains the LCS profile 104, or obtains the LCS profile 104 from a memory as described above. Also, the scan engine 208 communicates with the data collector module 210, and obtains information about the logical build 106 in the infrastructure 216. With these two sources of information, the scan engine 208 can then compare the LCS profile 104 in the specified format and the logical build as implemented in the infrastructure 216. The scan engine 208 systematically verifies aspects, e.g., the existence of components, naming of components, configurations of components, connections of components, IP addresses of components and ports, versions of components, features, software installation, software versions, licenses, etc., in the logical build 106 in the infrastructure 216, and makes sure these aspects are the same as indicated in the LCS profile 104 in the specified format. Alerts 112 and a CRG report 116, as shown in FIG. 1, are generated by the scan engine 208 and issued by the user interface module 206. In some embodiments, the user interface module 206 formats the alerts 112 and the CRG report 116 for presentation via a user interface generated by the user interface module 206.

Figure 3:
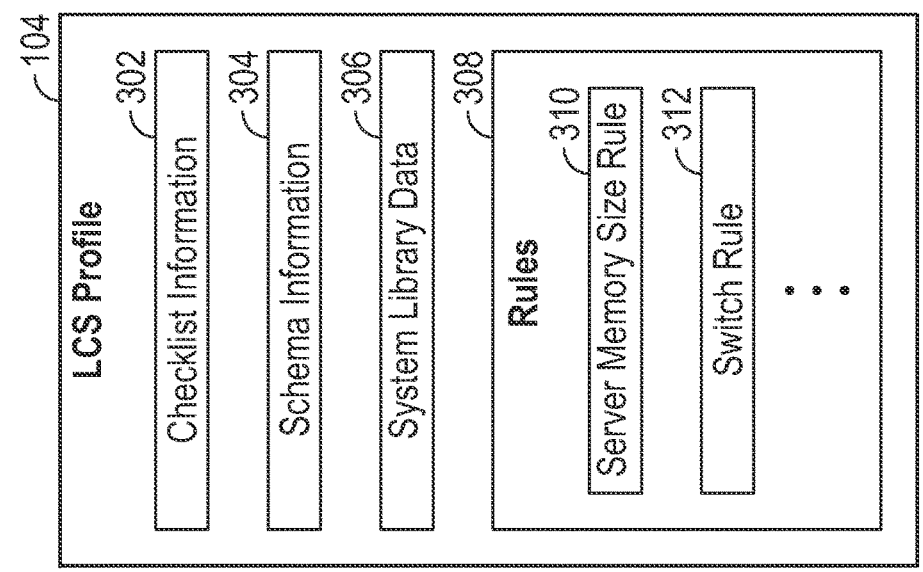
FIG. 3 is an example LCS profile applicable to the LCS compliance scan in accordance with some embodiments.

FIG. 3 is an example LCS profile 104 applicable to the LCS compliance scan 108. Further examples specific to various logical builds and various formats are readily devised. The format shown in FIG. 3 is generic and symbolic only, representing types of possible content, and does not include explicit examples of code written in XCCDF, OVAL, or XML that represents the generic format illustrated. The example LCS profile 104 in FIG. 3 includes checklist information 302, schema information 304, system library data 306, and rules 308. The example rules 308 include a server memory size rule 310 and a switch rule 312. Any discrepancies between the logical build and the LCS profile 104 may be noted in the CRG report of FIG. 5. Various further rules pertaining to specific components in a converged infrastructure may be integrated into the embodiments. Rules can also apply to security constraints, in various embodiments. The LCS profile 104 can include component names, IP addresses, parameter names, parameter values, profile identifiers, rule identifiers, and further details.

Figure 4:
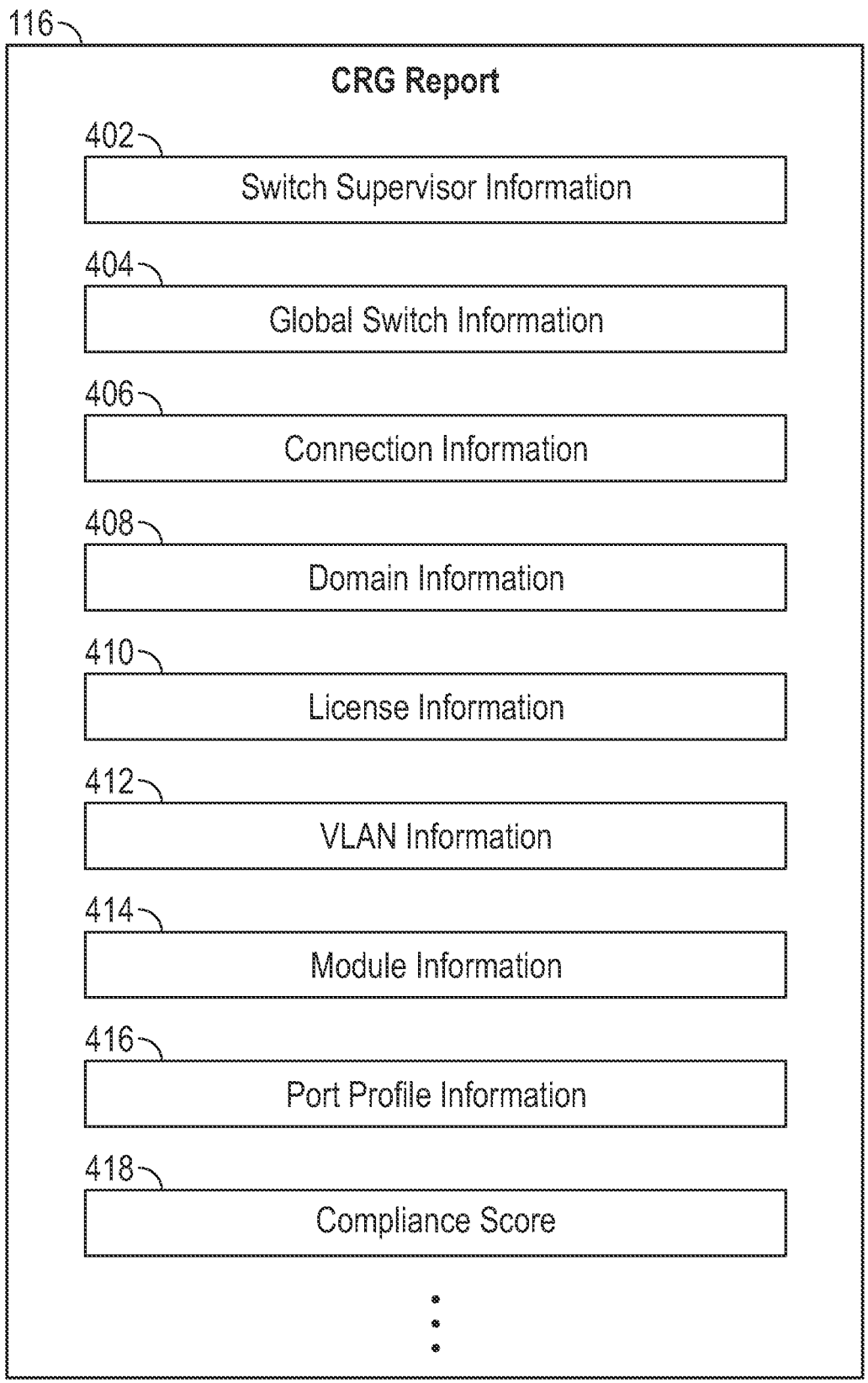
FIG. 4 is an example CRG (configuration report guide) report, which can be produced by the LCS compliance scan in accordance with some embodiments.

FIG. 4 is an example CRG report 116, which can be produced by the LCS compliance scan 108. Further examples specific to various logical builds and various formats are readily devised as the format shown in FIG. 4 is one example. The CRG report 116 includes switch supervisor information 402, global switch information 404, connection information 406, domain information 408, license information 410, VLAN information 412, module information 414, port profile information 416 and a compliance score 418. The compliance score 418 could be a percentage of compliance, a ranking on a scale, or text-based, etc., and could indicate the relative compliance or the number of discrepancies. Various further types of information can be added to the CRG report 116. For example, the CRG report 116 can include component names, IP addresses, model names and numbers, serial numbers, usernames, passwords, system names, server identifiers, build numbers, domain identifiers, mode numbers, state information, feature information, install status, use status, license expiration dates, VLAN identifiers, VLAN names, VLAN states, module identifiers, module types, module status, server names, server IP addresses, module versions, host versions, UUID (universally unique identifier), port types, port names, pending information and so on. In addition, the status of the various components may be provided in the list. For example, whether the component is active or whether there is an alert associated with the component may be provided in the generated CRG report.

Figure 5:
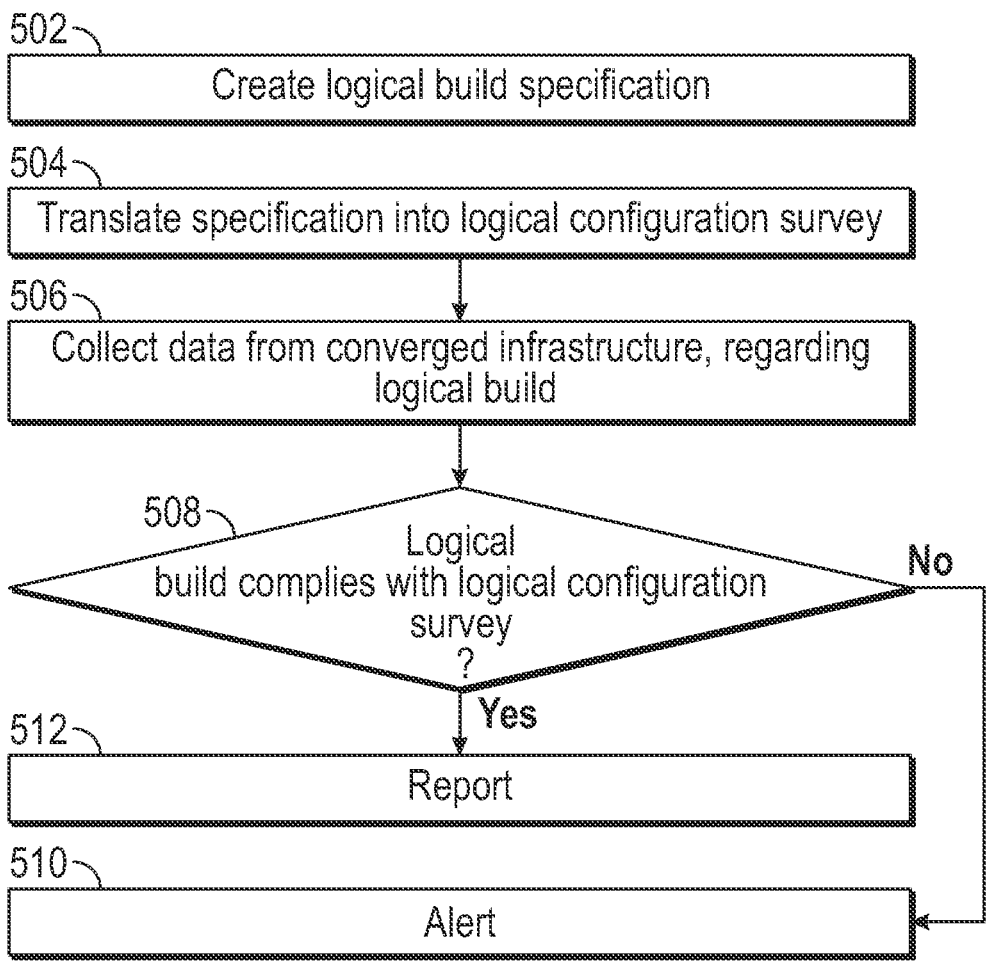
FIG. 5 is a flow diagram of a method for determining compliance of a logical build in a converged infrastructure, which can be practiced on or by the system shown in FIG. 2 in accordance with some embodiments.

FIG. 5 is a flow diagram of a method for determining compliance of a logical build in a converged infrastructure, which can be practiced on or by the system shown in FIG. 2. The actions described below can be performed by a processor, for example in a computing device having a scan engine and a data collector as described above. A logical build specification is created, in an action 502. The logical build specification could be in a spreadsheet format, a format specific to a provider or a component, host or system in an infrastructure, or other format useful to a user or a system. The specification is translated into a logical configuration survey, in an action 504. The logical configuration survey is in a predefined format, such as XCCDF, OVAL or XML. In some embodiments the logical configuration survey covers the information provided with reference to FIG. 3. Data is collected from the converged infrastructure, regarding the logical build, in an action 506. For example, a data collector coupled to an infrastructure in which the logical build is implemented can gather data by one of the techniques or mechanisms discussed above with reference to FIGS. 1 and 2. In a decision action 508, it is determined whether the logical build complies with the logical configuration survey. For example, the scan engine can compare the logical configuration survey in the predefined format to the data collected from the infrastructure regarding the logical build. If the answer is no, there is at least one discrepancy, an alert is issued in an action 510. If the answer is yes, the logical build complies with the logical configuration survey, a report is issued in an action 512. The report may take the format of the CRG report illustrated with reference to FIG. 4 in some embodiments.

Figure 6:
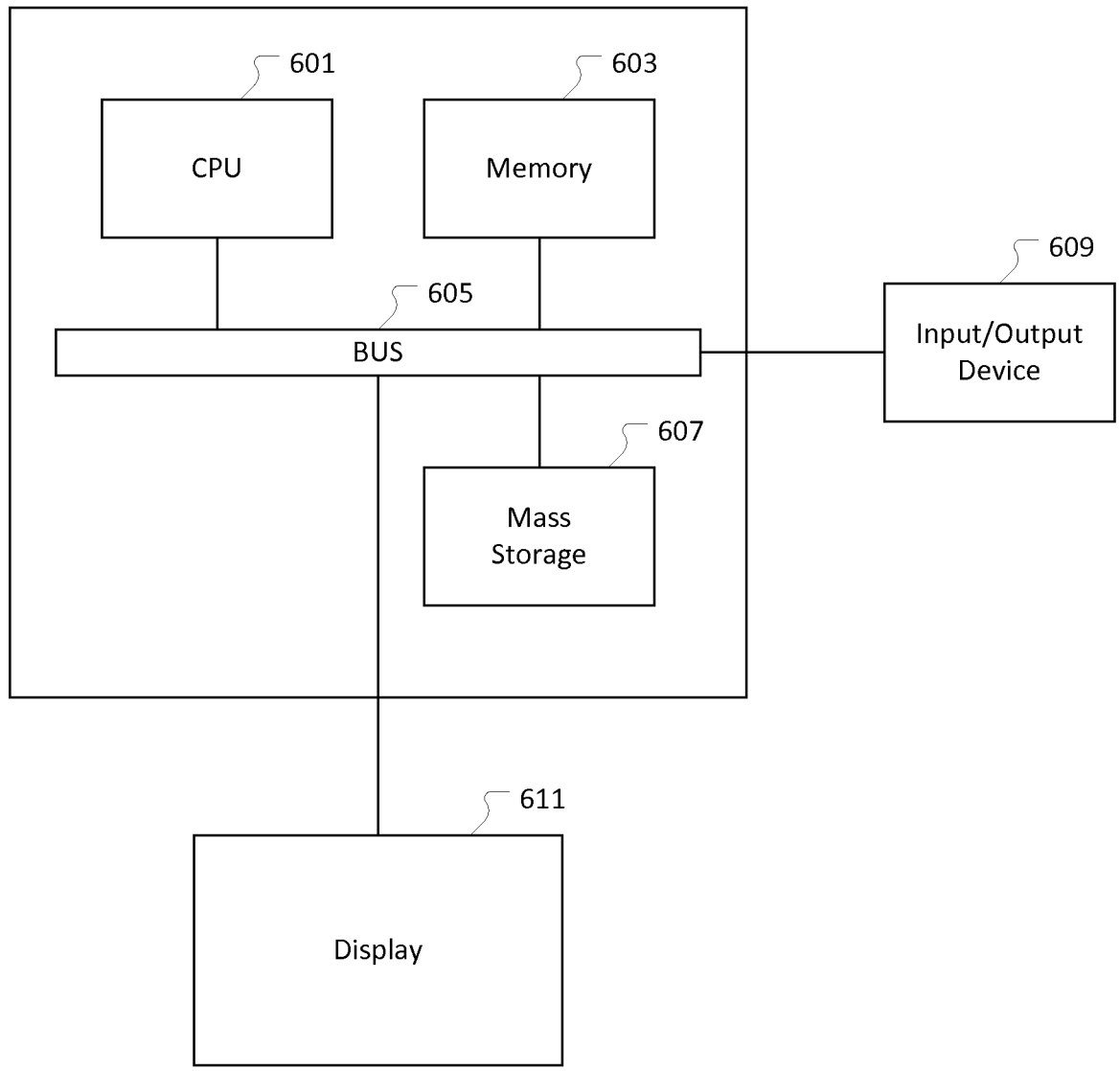
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for optimization of a converged infrastructure logical build in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for determining compliance of a logical build in a converged infrastructure, comprising:
   receiving a logical configuration survey in a predefined format, wherein the logical configuration survey represents a specification for a logical build to be implemented in a converged infrastructure;
   collecting data from the converged infrastructure regarding the logical build as implemented in the converged infrastructure;
   determining, from the collected data, that there is a discrepancy between the logical build as implemented and the logical configuration survey in the predefined format;
   issuing an alert, responsive to determining a discrepancy between the logical build as implemented and the logical configuration survey in the predefined format, wherein the alert is comprised of information indicating an error in at least one of the logical configuration survey in the predefined format and the logical build;
   mitigating, responsive to determining that there is a discrepancy between the logical build as implemented and the logical configuration survey, at least one error by receiving corrections to the logical configuration survey associated with the discrepancy; and
   regenerating the logical build using the corrected logical configuration survey, wherein at least one method operation is executed through a processor.

2. The method of claim 1, further comprising:
   issuing a report, responsive to determining compliance of the logical build as implemented and the logical configuration survey in the predefined format.

3. The method of claim 1, wherein the predefined format is one of XCCDF (extensible configuration checklist description format), or OVAL (open vulnerability and assessment language).

4. The method of claim 1, wherein the predefined format includes XML (extensible markup language).

5. The method of claim 1, wherein determining whether the logical build complies with the logical configuration survey comprises:
verifying compliance to the logical configuration survey in the predefined format of network, compute and storage components, at least one IP (Internet protocol) address, and at least one VLAN (virtual local area network) connection, as implemented in the converged infrastructure.

6. The method of claim 1, wherein the logical build is to be implemented in the converged infrastructure in a network appliance.

7. A tangible, non-transitory, computer-readable media having instructions thereupon which, when executed by a processor, cause the processor to perform a method comprising:
receiving a logical configuration survey in a predefined format, wherein the logical configuration survey represents a specification for a logical build to be implemented in a converged infrastructure;
collecting data from the converged infrastructure regarding the logical build as implemented in the converged infrastructure;
determining, from the collected data, that there is a discrepancy between the logical build as implemented and the logical configuration survey in the predefined format;
issuing an alert, responsive to determining a discrepancy between the logical build as implemented and the logical configuration survey in the predefined format, wherein the alert is comprised of information indicating an error in at least one of the logical configuration survey in the predefined format and the logical build;
mitigating, responsive to determining that there is a discrepancy between the logical build as implemented and the logical configuration survey, at least one error by receiving corrections to the logical configuration survey associated with the discrepancy; and
regenerating the logical build using the correct logical configuration survey.

8. The computer-readable media of claim 7, wherein the method further comprises:
issuing a report, responsive to determining compliance of the logical build as implemented and the logical configuration survey in the predefined format.

9. The computer-readable media of claim 7, wherein the predefined format is one of: XCCDF (extensible configuration checklist description format), or OVAL (open vulnerability and assessment language).

10. The computer-readable media of claim 7, wherein the predefined format includes XML (extensible markup language).

11. The computer-readable media of claim 7, wherein determining whether the logical build complies with the logical configuration survey includes verifying compliance to the logical configuration survey in the predefined format of network, compute and storage components, at least one IP (Internet protocol) address, and at least one VLAN (virtual local area network) connection, as implemented in the converged infrastructure.

12. The computer-readable media of claim 7, wherein the logical build is to be implemented in the converged infrastructure in a network appliance.

13. An apparatus for determining compliance of a logical build in a converged infrastructure, comprising:
a processor;
a compliance scan engine, coupled to receive a logical configuration survey in a predefined format, wherein the logical configuration survey represents a specification for a logical build to be implemented in a converged infrastructure;
an automated data collector coupled to collect data from the converged infrastructure regarding the logical build as implemented in the converged infrastructure; and
the compliance scan engine further coupled to the processor to determine, from the data as collected by the automated data collector, that there is a discrepancy between the logical build as implemented and the logical configuration survey in the predefined format,
wherein the compliance scan engine configured to issue an alert, responsive to determining a discrepancy between the logical build as implemented and the logical configuration survey in the predefined format,
wherein the alert is comprised of information indicating an error in at least one of the logical configuration survey in the predefined format and the logical build, and
wherein the compliance scan engine, in response to determining that there is a discrepancy between the logical build as implemented and the logical configuration survey, receives corrections to the logical configuration survey associated with the discrepancy; and
regenerates the logical build using the corrected logical configuration survey.

14. The apparatus of claim 13, further comprising:
the compliance scan engine configured to issue a report, responsive to determining compliance of the logical build as implemented and the logical configuration survey in the predefined format.

15. The apparatus of claim 13, wherein the predefined format includes one of: XCCDF (extensible configuration checklist description format), OVAL (open vulnerability and assessment language), or XML (extensible markup language).

16. The apparatus of claim 13, wherein determining whether the logical build complies with the logical configuration survey includes verifying compliance to the logical configuration survey in the predefined format of network, compute and storage components, at least one IP (Internet protocol) address, and at least one VLAN (virtual local area network) connection, as implemented in the converged infrastructure.

17. The apparatus of claim 13, further comprising a network appliance, wherein the processor, the compliance scan engine and the automated data collector are included in the network appliance and wherein the logical build is to be implemented in the converged infrastructure in the network appliance.

* * * * *